May 26, 1942.  H. CHLOPECKY  2,284,261

CASHIER'S AND TELLER'S CAGE

Filed Sept. 13, 1940  2 Sheets-Sheet 1

INVENTOR
H. Chlopecky
BY J. Edw. Maybee
ATTY

May 26, 1942.  H. CHLOPECKY  2,284,261
CASHIER'S AND TELLER'S CAGE
Filed Sept. 13, 1940   2 Sheets-Sheet 2

INVENTOR
H. Chlopecky
BY J. Edw. Maybee
ATTY

Patented May 26, 1942

2,284,261

UNITED STATES PATENT OFFICE 2,284,261

CASHIER'S AND TELLER'S CAGE

Harry Chlopecky, Toronto, Ontario, Canada

Application September 13, 1940, Serial No. 356,713

8 Claims. (Cl. 109—17)

This invention relates to cashiers' or tellers' cages.

The object of this invention is to provide means which will not only protect the cashier from a robber, but also records the appearance of the robber.

Figure 1:
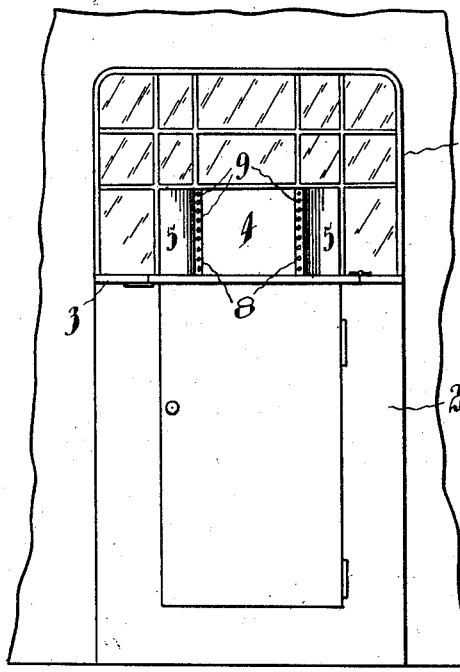
Figure 2:
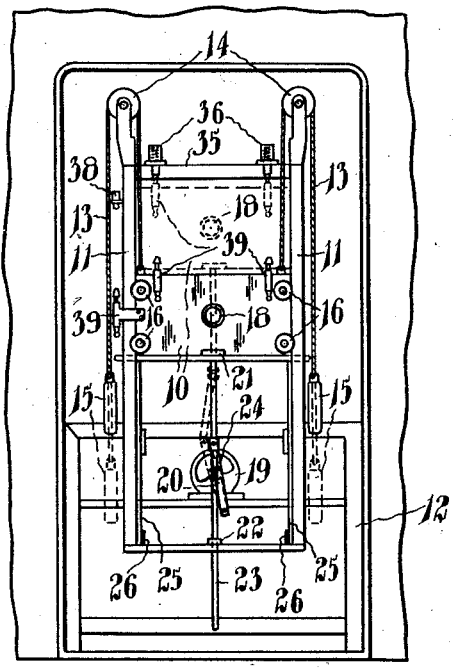
Figure 3:
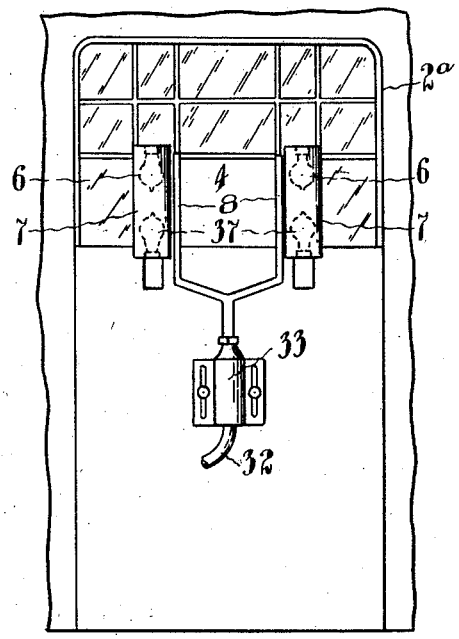
Figure 4:
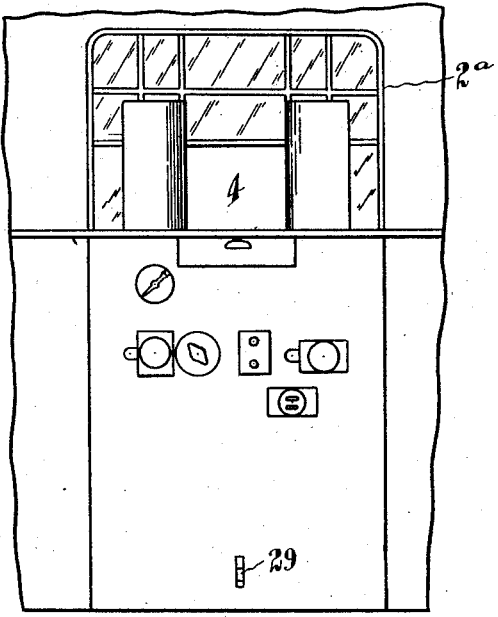
Figure 5:
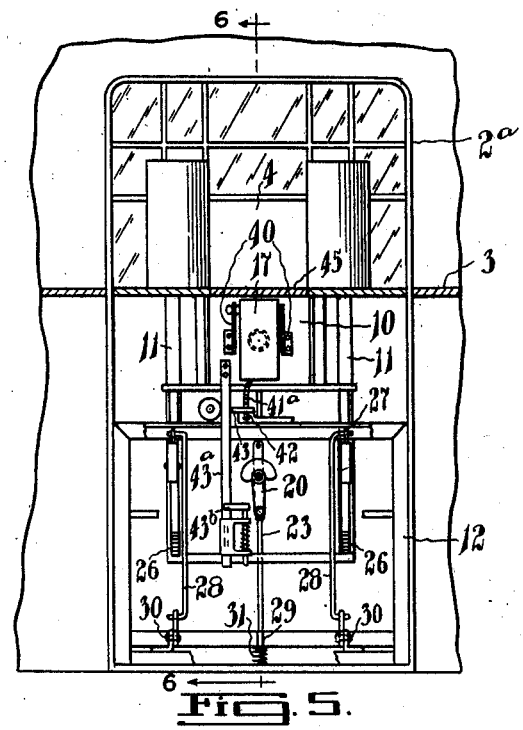
Figure 6:
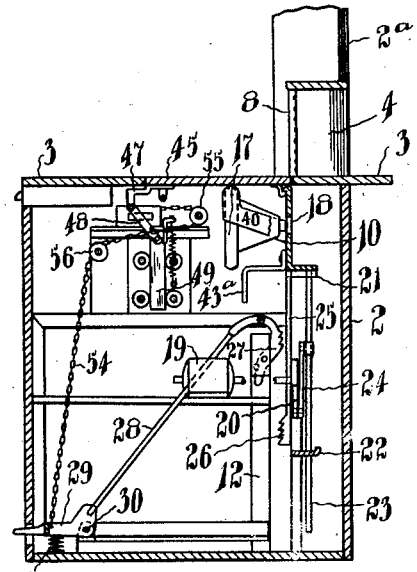
Figure 7:
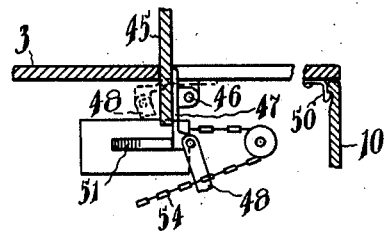
Figure 9:
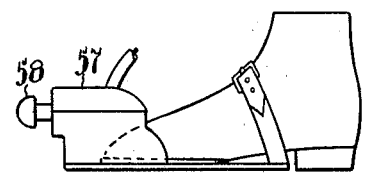
Figure 8:
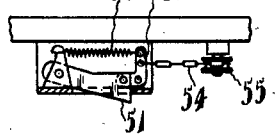

The invention is hereinafter described, by way of example, and is illustrated in the accompanying drawings in which Fig. 1 is a front view;

Fig. 2 a front view with the front panel removed;

Fig. 3 a rear view of the front panel;

Fig. 4 a rear view;

Fig. 5 a rear view with rear panel removed;

Fig. 6 a section on line 6—6 in Fig. 5;

Figs. 7 and 8 details of the trap door and latch;

Fig. 9 a view of the operating switch; and

Figure 10:
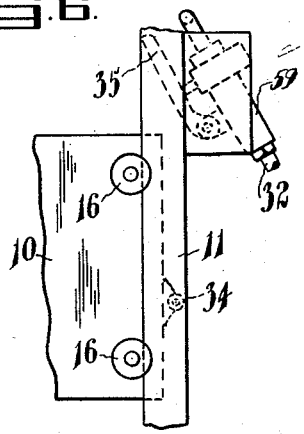

Fig. 10 an enlarged view of the compressed air valve.

In the drawings like numerals of reference indicate corresponding parts in the different figures.

The fragmentary view of a cashier's or teller's cage in the drawings show a counter section 2. The counter section 2 includes a counter 3, a front 2ª extending from the floor to a suitable distance above the counter, and having a wicket or opening therein through which business may be transacted. The upper part of the front 2ª of the counter section is made of bullet-proof glass while the rest of the counter section and walls can be made of any suitable material. On each side of the opening 4 are glass shields 5 behind which are mounted electric light bulbs 6 and reflectors 7. Also mounted adjacent the wicket or opening 4 are conduits 8 in which are formed perforations 9 through which noxious powder or tear gas can escape.

Mounted behind the front of the counter section 2 is a closure 10 for the wicket or opening 4.

The closure 10 is carried on guides 11 which are supported on a main frame 12. Counterbalancing weights 15 are attached to the closure 10 by means of ropes or cables 13 which pass over pulleys 14 carried on top of the guides 11. In order that the closure will move freely rollers 16 are mounted thereon which engage the guides 11. Carried on the rear sides of the closure is a camera 17 having the lens projecting through an opening 18 in the said closure. Details of the operation of the camera will be described later.

Mounted on a suitable part of the main frame 12 is an electric motor 19 to the shaft of which is secured an arm 20. Engaging the closure 10 by free abutting relationship and mounted in suitable bearings 21 and 22 which are carried by the guides 11, is a vertically movable rod 23. Connecting this rod 23 to the arm 20 which is secured to the shaft of the motor 19 is a link 24. It will be seen that the operation of the electric motor will move the rod 13 upwardly, which in turn will move the closure 10 upwardly to close the wicket or opening 4.

Extending downwardly from the closure 10 are extensions 25 having secured to their lower ends ratchets 26. When the closure is moved upwardly by the electric motor to close the wicket or opening 4, the ratchets 26 are engaged by pawls 27 and lock the closure in its up position. In order that the pawls 27 can be released from the ratchet there is provided a link 28 attached to the pawls 27 and connected to a lever or pedal 29 which is pivoted by means of a pin 30 on the main frame. The spring 31 under the pedal 29 returns the pawls 27 to a position in which they will engage the ratchets 26 when the ratchets are in their upward position.

Carried by one of the guides 11 is a valve 59, one side of which is connected to a compressed air tank and the other by means of the tube 32 to the noxious powder holder 33, which is carried on the front panel of the counter section 2. Carried by the closure 10 is a roller 34 which is adapted to engage the lever 35 of the valve 59 to open the valve when the closure is in the upward position. The opening of the valve will allow the compressed air to pass through the valve, through the tube 32 to the powder holder 33 forcing the powder in the holder through tubes 8 and out through openings 9 therein.

Carried on a cross member 35 are two electric push switches 36. One switch is connected by suitable wiring (not shown) to an alarm device (not shown) which is located adjacent the cashier's cage and the other switch by suitable wiring (not shown) to the flood lights 6. Carried on one of the guides 11 is a third push switch 38. This switch is connected by suitable wiring (not shown) to a remote signal which could be located in a police station or other suitable place. Carried on the closure 10 are spring loaded switch closing members 39 which, just before the closure 10 completes its upward travel, engage the switches 36, 36 and 38 to cause the respective devices to which they are connected to operate.

The camera 17 which is carried by the closure 10 by means of brackets 40 has attached to the shutter an operating cable 41ª having an outer casing and an operating plunger 42 on the end thereof. The end of the casing 41ᵃ being attached to a bracket 43 which is carried by the main frame 12. Attached to the closure and movable therewith is a downwardly projecting camera operating member 43ᵃ having attached to its lower end and at right angles thereto a spring loaded bracket 43ᵇ. This bracket 43ᵇ engages the camera operating plunger 42 on the end of the cable 41 to operate the camera just as the closure 10 completes its upward course.

All the operating mechanism of the device is located under the counter 3. To allow the upward movement of the closure 10 and the camera 17 is a door 45 which is hinged to the counter 3 by means of the hinges 46. Extending from the hinged end of the door is an extension 47 which is connected by means of a link 48 to a spring operated slide 49. To hold the door 45 closed, there is provided at its end remote from the hinge a latch 50 which engages the closure 10. The upward movement of the closure 10 will release the latch allowing the slide 49 through the link 48 to open the door 45. To hold the door in open position there is provided a spring latch 51 which is held in its locking position by means of the bell crank 52, one arm of which is connected to the latch and the other to a tension spring 53.

In order that the door 45 may be closed there is connected to the same arm of the bell crank 52 as the spring a chain or cable 54 which passes over pulleys 55 and 56 and is connected to the pedal 29. When the pedal 29 is depressed the chain or cable 54 will pull on the bell crank 52 causing the latch 50 to release the extension 47 to allow the door 45 to be closed. The switch for operating the electric motor is carried on the cashier's foot (see Fig. 9). A cap 57 fits over the toe of the cashier's foot and has in the end thereof a push switch 58 which is connected to the electric motor by a suitable wire, not shown. The closing of the switch will cause the motor to start and the device to operate.

The device is operated as follows. The push switch 58 which is carried by the teller on his foot is closed. This causes the electric motor 19 to start. The arm 20 which is attached to the shaft will rotate with the shaft of the motor. The arm 20 is connected to the rod 23 by means of a link 24. The upward movement of the arm 20 will, through the link 24, cause the rod 23 to move upwardly, moving the closure 10 upwardly to close the opening 4. Just as the closure 10 has completed its upward travel, the roller 34 carried by the closure 10 engages the lever 35 to open the compressed air valve 59 to force the noxious powder in the tank 33 through the openings 9 in conduits 8.

At about the same time as the valve 59 is opened, the electric switches 36 and 38 are closed by the spring loaded switch closers 39, which will cause the warning devices to operate and the flood lights to light.

Simultaneously with the lighting of the flood lights the bracket 43ᵇ on the camera operating member 43ᵃ which is carried by the closure 10, engages the camera operating plunger 42 on the cable 41 to cause the camera to operate. Instantaneously with the upward movement of the closure 10, the trap door 45 opens to allow the camera 17 to pass through the counter 3.

The pressing of the pedal 29 will release the pawls 27 which engage the ratchet 26 to hold the closure in closed position and allow it to return to its original position.

The pressing of the pedal 29 also releases the latch 51 which holds the trap door open so that it can be closed.

What I claim as my invention is:

1. A cashier's or teller's cage having an opening through which business can be conducted; a vertically movable closure for said opening; guides for the closure; means for operating said closure comprising an electric motor; an arm connected to the shaft of said motor; a vertically movable rod engaging by free abutting relation with said closure; a bearing in which the rod is slidably mounted; a link pivotally connected at one end to said arm and at the other end to said rod, whereby the rod is raised and lowered when the motor is operated, said rod being adapted to raise the closure to closed position when said rod is raised; and means for locking the closure in its closed position.

2. A cashier's or teller's cage having an opening through which business can be conducted; a vertically movable closure for said opening; guides for the closure; means for operating said closure comprising an electric motor; an arm connected to the shaft of said motor; a vertically movable rod engaging by free abutting relation with said closure; a bearing in which the rod is slidably mounted; a link pivotally connected at one end to said arm and at the other end to said rod whereby the rod is raised and lowered when the motor is operated, said rod being adapted to raise the closure to closed position when said rod is raised; and means for locking said closure in its closed position comprising a ratchet carried by said closure and a pawl mounted on the cage adapted to engage said ratchet.

3. A cashier's or teller's cage having an opening through which business can be conducted; a vertically movable closure for said opening; guides for the closure; means for operating said closure comprising an electric motor; an arm connected to the shaft of said motor; a vertically movable rod engaging by free abutting relation with said closure; a bearing in which the rod is slidably mounted; a link pivotally connected at one end to said arm and at the other end to said rod whereby the rod is raised and lowered when the motor is operated, said rod being adapted to raise the closure to closed position when said rod is raised; means for locking said closure in its closed position comprising a ratchet carried by said closure; a pawl mounted on the cage adapted to engage said ratchet; and a release for said pawl to allow said closure to return to normal position.

4. A cashier's or teller's cage having an opening through which business can be conducted; a vertically movable closure for said opening; guides for the closure; means for operating said closure comprising an electric motor; an arm connected to the shaft of said motor; a vertically movable rod engaging by free abutting relation with said closure; a bearing in which the rod is slidably mounted; a link pivotally connected at one end to said arm and at the other end to said rod whereby the rod is raised and lowered when the motor is operated, said rod being adapted to raise the closure to closed position when said rod is raised; means for locking said closure in its closed position comprising a ratchet carried by said closure; a pawl mounted on the cage adapted to engage said ratchet; a release for said pawl to allow said closure to return to normal position; a link attached to said pawl;

and a pedal connected to said link to release said pawl from said ratchet when said pedal is depressed.

5. A cashier's or teller's cage having an opening through which business can be conducted, a vertically movable closure for said opening; guides for the closure; a counter having an aperture therein through which the closure passes; a door for said aperture; a latch on the side of the door adjacent the closure, engaged by the closure and releasable by the movement of said closure; a hinge on said door opposite said latch; and a spring tending to open said door against said latch.

6. A cashier's or teller's cage having an opening through which business can be conducted; a vertically movable closure for said opening; guides for the closure; a counter having an aperture therein through which the closure passes; a door for said apertures; a latch on the side of the door adjacent the closure, engaged by the closure and releasable by the movement of said closure; a hinge on said door opposite said latch; a spring tending to open said door against said latch; a latch for retaining the door in its open position; and means for releasing said latch to permit closing of said door.

7. A cashier's or teller's cage having an opening through which business can be conducted, a vertically movable closure for said opening; guides for the closure; a counter having an aperture therein through which the closure passes; a door for said aperture; a latch on the side of the door adjacent the closure, and releasable by the movement of said closure; a hinge on said door opposite said latch; a spring tending to open said door against said latch; a latch for retaining the door in its open position; means for releasing said latch to permit closing of said door; means for locking the closure in its closed position; means for releasing the closure locking means to permit the closure to return to its normal open position; and means for simultaneously operating the door latch releasing means and the closure lock releasing means.

8. A cashier's or teller's cage having an opening through which business can be conducted, a vertically movable closure for said opening; guides for the closure; a counter having an aperture therein through which the closure passes; a door for said aperture; a latch on the side of the door adjacent the closure, and releasable by the movement of said closure; a hinge on said door opposite said latch; a spring tending to open said door against said latch; a latch for retaining the door in its open position; and means for releasing said latch to permit closing of said door, said latch releasing means including a bell crank lever, a tension spring, one end of the bell crank lever being connected to the latch and the other to the tension spring, a pulley, a cable, and a foot pedal, the cable being secured to the same end of the bell crank as the spring and to the foot pedal, and extending over the pulley, whereby when the foot pedal is depressed the latch will be released.

HARRY CHLOPECKY.